UNITED STATES PATENT OFFICE.

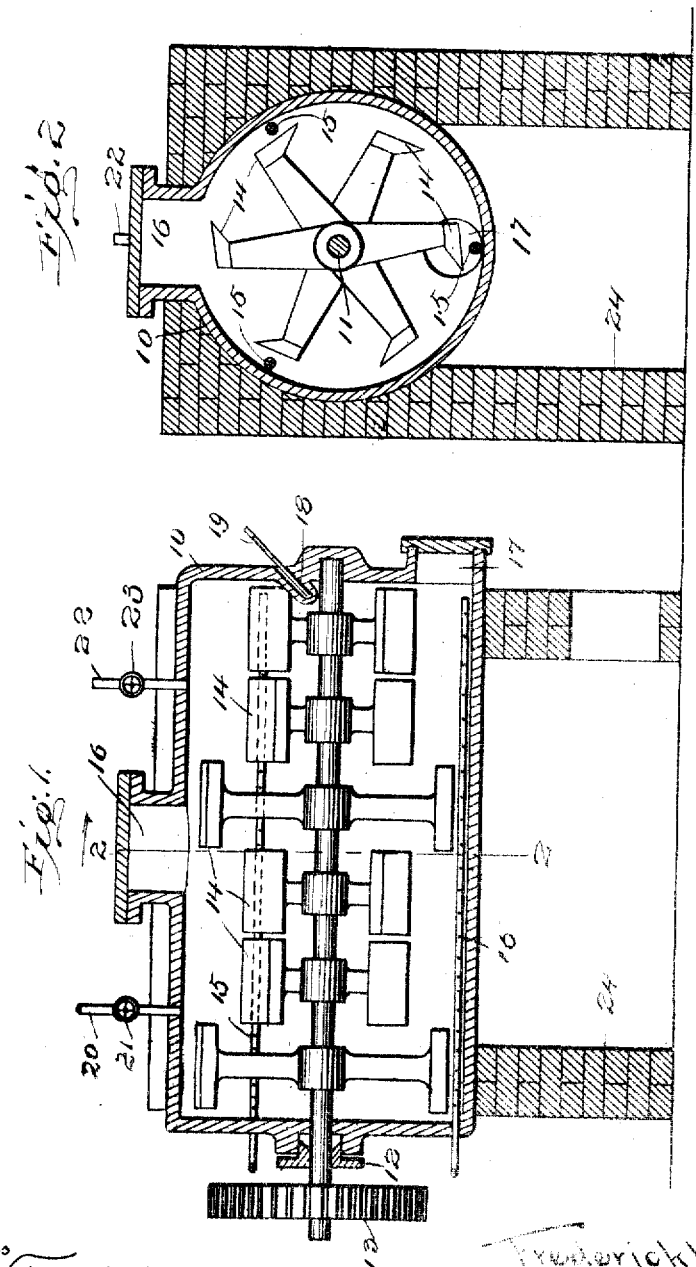

FREDERICK W. FRERICHS, OF ST. LOUIS, MISSOURI.

PROCESS OF MANUFACTURING AMMONIA.

No. 905,415.  Specification of Letters Patent.  Patented Dec. 1, 1908.

Application filed October 5, 1907. Serial No. 396,096.

*To all whom it may concern:*

Be it known that I, FREDERICK W. FRERICHS, a citizen of the United States, residing at St. Louis, in the county of St. Louis and State of Missouri, have invented certain new and useful Improvements in Processes of Manufacturing Ammonia; and I do hereby declare the following to be a full, clear, and exact description of the invention, such as will enable others skilled in the art to which it appertains to make and use the same.

This invention relates to improvements in the process of manufacturing ammonia and is directed more particularly to the production of pure ammonia from crude ammoniacal liquors.

One of the objects of the present improved process is to obtain ammonia in a purer state and with less expense than is possible by processes now in general use.

Another object of the present process is to obtain commercial sulfate of ammonium freed from volatile carbon and nitrogenous-organic compounds.

These objects are attained to such an extent that volatile carbon compounds and nitrogenous-organic compounds which remain in the ammonia and the commercial sulfate of ammonium obtained by the usual processes are removed, and the cheapness with which the present improved process may be carried out will readily be appreciated by those skilled in the art, since only such amount of lime is required as is necessary to decompose the non-volatile ammonia compounds contained in the ammoniacal liquor, and theoretically, no sulfuric acid is lost in carrying out the process, only such sulfuric acid being actually lost as escapes in handling and by oxidation, the same sulfuric acid being used over and over.

As a conventional means for carrying into effect the present invention a drawing is herewith presented wherein Figure 1 is a longitudinal, vertical, sectional view of the apparatus, and Fig. 2 a transverse, vertical, sectional view taken on line 2—2 of Fig. 1 looking in the direction of the arrow.

The apparatus here conventionally shown comprises a cylindrical or substantially cylindrical retort 10 within which a shaft 11 is journaled through the usual and ordinary packing box or gland 12 and operated by any approved means as the gear 13. The shaft 11 carries a plurality of agitators of any approved form shown as at 14 and pipes 15 are provided through which air may be forced.

For charging the retort an opening 16 is provided having any form of closure, and a discharge opening 17 with a closure is also provided. Preferably a pocket 18 is formed in one end of the retort in which a thermometer 19 may rest and a pipe 20 controlled by a valve 21 is employed for discharging the products of decomposition. A pipe 22 controlled by a valve 23 is also employed from which the ammonia gas may be discharged.

The whole retort is preferably set in the furnace presented conventionally at 24 heated in any approved manner.

In carrying out the present improved process, the process is started by heating commercial sulfate of ammonium in a suitable still which is preferably provided with an agitating device to a temperature sufficiently high to volatilize the carbon compounds contained in the salt and to convert the nitrogenous-organic compounds into sulfate of ammonium by reacting with the sulfuric acid of the ammonium salt, but care must be taken that in this period of the process the temperature is kept below the degree at which considerable quantities of ammonia gas are liberated from the salt. In doing this the salt may safely be heated to 200° C., and in order to facilitate the process of purification an air blast may be introduced in the still in some suitable manner. When all of the nitrogenous organic compounds and all of the carbon compounds which term includes methyl alcohol, ethyl alcohol, isopropyl alcohol, acetone, benzol, toluol, naphthalin and similar compounds have been volatilized or destroyed and the products of decomposition have been eliminated, the temperature is increased to such a degree that all of the salt or a material proportion thereof decomposes according to the following formula—

$$(NH_4)_2SO_4 = NH_4HSO_4 + NH_3.$$

This takes place at or about 350° C., but the process can be hastened without destroying any ammonia by raising the temperature to 400° C., in which case part of the acid sulfate of ammonium is decomposed into pyrosulfate of ammonium and water, according to the formula

$$2NH_4HSO_4 = (NH_4)_2S_2O_7 + H_2O.$$

If the temperature is much higher than 400° C. considerable quantities of nitrogen are evolved which proves a decomposition and consequent loss of ammonia. The resulting pure ammonia gas may then be worked into such products as may be desired, and the acid sulfate of ammonium and pyrosulfate of ammonium resulting from the operation are dissolved in water, and the resulting solution of acid sulfate of ammonium is utilized for absorbing volatile ammonium compounds and impure ammonia gas coming from crude ammoniacal liquors during the initial distillation thereof or otherwise obtained, this completing the circle of operation. The sulfate of ammonium thus obtained is treated as before and the process may be repeated indefinitely and pure ammonia may be produced from crude liquor by the use of the small amount of sulfate of ammonium originally employed and the rotation of the process may continue indefinitely without waste except such as may arise by handling of the sulfuric acid and the oxidation thereof. By careful work this loss is insignificant compared with the loss of the entire amount of the sulfuric acid and of all the lime which is unavoidable in the old processes.

In the described process part of the sulfate of ammonium may be substituted by other sulfates, for instance sulfate of potassium, or sulfate of sodium, or a mixture of both, in which case, at practically the same temperatures as in the original process, the reactions take place in part or altogether according to the following formulæ:

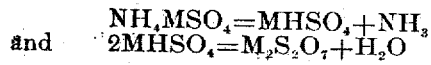
$$NH_4MSO_4 = MHSO_4 + NH_3$$
and $$2MHSO_4 = M_2S_2O_7 + H_2O$$

in which M stands for K or Na or similar elements, as the case may require.

I find that the amount of lime saved is approximately 95% of the old processes since only so much lime is used in the present process as is necessary to decompose the non-volatile ammonium compounds contained in the ammoniacal liquor which is introduced into the process.

A great advantage becomes obvious in the present process when it is considered that the volatile carbon compounds comprising the methyl alcohol, ethyl alcohol, isopropyl alcohol, acetone, toluol, benzol, napthalene and similar compounds, all of which are regarded as contributing to excessive pressures frequently occurring in refrigerating plants, are eliminated from the ammonia and ammonium sulfate with the nitrogenous organic compounds, which includes the pyridin $C_5H_5N$ and methylamin $NH_2CH_3$ groups. This elimination results in pure ammonia and pure commercial sulfate of ammonia.

I claim:—

1. In a process of the class specified, distilling off the ammonia and volatile ammonium compounds from ammoniacal liquors, combining the same with acid sulfate of ammonium for making neutral sulfate of ammonium and decomposing the neutral sulfate of ammonium by heat into free ammonia gas and acid sulfate of ammonium.

2. In a process of the class specified, distilling off the ammonia and volatile ammonium compounds from ammoniacal liquors, combining the same with acid sulfate of ammonium for making neutral sulfate of ammonium and decomposing a large part thereof by heat into free ammonia gas and acid sulfate of ammonium.

3. In a process of the class specified, distilling off ammonia and volatile ammonium compounds from ammoniacal liquors combining the same with acid sulfate of ammonium for making neutral sulfate of ammonium decomposing the neutral sulfate of ammonium or a large portion thereof by heat into free ammonia gas adapted for being worked into commercial products and acid sulfate of ammonium or pyrosulfate of ammonium or a mixture of both adapted for being returned for use in the beginning of the process.

4. In a process of the class specified, purifying sulfate of ammonium from carbon compounds including nitrogenous-organic compounds by heating the impure salt to such a temperature that the nitrogenous organic compounds are converted into ammonium sulfate by reacting with the sulfuric acid of the ammonium salt.

5. In a process of the class specified, purifying sulfate of ammonium from carbon compounds including nitrogenous organic compounds comprising heating the impure salt under the influence of a blast of air to such a temperature that the volatile carbon compounds are volatilized or oxidized and that the nitrogenous-organic compounds are converted into ammonium sulfate by reacting with the sulfuric acid of the ammonium salt.

6. In a process of the class specified, purifying sulfate of ammonium from carbon compounds including nitrogenous-organic compounds, comprising heating the impure salt while agitating the same, the heat being raised to such a temperature that the volatile carbon compounds are volatilized or oxidized and that the nitrogenous organic compounds are converted into ammonium sulfate.

7. In a process of the class specified distilling off the ammonia and volatile ammonium compounds from ammoniacal liquors combining the same with one or more acid sulfates to make neutral salts and decomposing all or a large part thereof by heat into free ammonia gas and acid sulfates.

8. In a process of the class specified, distilling off the ammonia and volatile ammonia compounds from ammoniacal liquors, combining the same with one or more acid sulfates to make neutral salts and decomposing all or a large part thereof by heat into free ammonia gas and pyrosulfates.

In testimony whereof I affix my signature in presence of two witnesses.

FREDERICK W. FRERICHS.

Witnesses:
M. G. BAUGHER,
E. M. KITCHIN.